(12) United States Patent
Carter et al.

(10) Patent No.: US 10,677,064 B2
(45) Date of Patent: Jun. 9, 2020

(54) THERMAL SHIELDING IN A GAS TURBINE (71) Applicant: ROLLS-ROYCE plc, London (GB)

(72) Inventors: Neal Carter, Derby (GB); Sean A. Walters, Bristol (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 15/864,071

(22) Filed: Jan. 8, 2018

(65) Prior Publication Data

US 2018/0195394 A1    Jul. 12, 2018

(30) Foreign Application Priority Data

Jan. 12, 2017    (GB) .................................. 1700535.6

(51) Int. Cl.
*F01D 5/08* (2006.01)
*F01D 9/06* (2006.01)
*F01D 5/14* (2006.01)
*F01D 5/32* (2006.01)
*F01D 5/30* (2006.01)

(52) U.S. Cl.
CPC ............. *F01D 5/081* (2013.01); *F01D 5/082* (2013.01); *F01D 5/147* (2013.01); *F01D 5/3007* (2013.01); *F01D 5/3015* (2013.01); *F01D 5/3092* (2013.01); *F01D 5/323* (2013.01); *F01D 9/065* (2013.01); *F05D 2250/711* (2013.01); *F05D 2260/231* (2013.01); *F05D 2260/36* (2013.01)

(58) Field of Classification Search
CPC ....... F01D 5/082; F01D 5/323; F05D 2260/36
See application file for complete search history.

(56) References Cited

U.S. PATENT DOCUMENTS

| 4,626,169 A | 12/1986 | Hsing et al. |
| 2013/0078101 A1 | 3/2013 | Garin et al. |
| 2014/0079559 A1 | 3/2014 | Luczak |
| 2015/0360329 A1* | 12/2015 | Pham ............... B23P 6/045 419/8 |
| 2016/0160648 A1* | 6/2016 | Virkler ............ F01D 5/187 60/806 |

(Continued)

FOREIGN PATENT DOCUMENTS

| EP | 0495586 | 1/1992 |
| EP | 3000967 | 3/2016 |

(Continued)

OTHER PUBLICATIONS

European Search Report dated May 11, 2018, issued in EP Patent Application No. 17206637.

(Continued)

*Primary Examiner* — Igor Kershteyn
*Assistant Examiner* — Jason G Davis
(74) *Attorney, Agent, or Firm* — Brinks Gilson & Lione (57) ABSTRACT

An assembly for receiving in a radially extending bucket groove (31) of a turbine disc (22), the assembly including a turbine blade having an elongate body (26) of aerofoil cross-section, a root portion (24) at one end of the elongate body (26) and a tip at the other. The root portion (24) configured to be retained in the bucket groove (31). A heat shield (27) configured to be received between an end of the root portion (24) and a radially inner surface of the bucket groove (31) and to interlock with the root portion (24) in a manner which deters separation in a radial direction.

14 Claims, 5 Drawing Sheets

(56) References Cited

U.S. PATENT DOCUMENTS

2017/0159468 A1\* 6/2017 Granberg .............. F01D 11/001

FOREIGN PATENT DOCUMENTS

| EP | 3000968 | 3/2016 |
| EP | 3000967 A3 | 4/2016 |
| EP | 3000968 A3 | 4/2016 |
| EP | 3093433 | 11/2016 |
| GB | 2319308 | 5/1998 |

OTHER PUBLICATIONS

Great Britain Search Report dated Feb. 10, 2017, issued in Great Britain Patent Application No. 1700535.6.

\* cited by examiner

THERMAL SHIELDING IN A GAS TURBINE

CROSS-REFERENCE TO RELATED APPLICATION

This application is based upon and claims the benefit of priority from British Patent Application No. 1700535.6 filed 12 Jan. 2017, the entire contents of which are incorporated herein.

FIELD OF DISCLOSURE

The present disclosure concerns thermal shielding in a gas turbine, more particularly, thermal shielding of the bucket groove and disc rim where a turbine blade root meets the turbine disc.

BACKGROUND

In a gas turbine engine, ambient air is drawn into a compressor section. Alternate rows of stationary and rotating aerofoil blades are arranged around a common axis; together these accelerate and compress the incoming air. A rotating shaft drives the rotating blades. Compressed air is delivered to a combustor section where it is mixed with fuel and ignited. Ignition causes rapid expansion of the fuel/air mix which is directed in part to propel a body carrying the engine and in another part to drive rotation of a series of turbines arranged downstream of the combustor. The turbines share rotor shafts in common with the rotating blades of the compressor and work, through the shaft, to drive rotation of the compressor blades.

It is well known that the operating efficiency of a gas turbine engine is improved by increasing the operating temperature. The ability to optimise efficiency through increased temperatures is restricted by changes in behaviour of materials used in the engine components at elevated temperatures which, amongst other things, can impact upon the mechanical strength of the blades and the rotor disc which carries the blades. This problem is addressed by providing a flow of coolant through and/or over the turbine rotor disc and blades.

It is known to take off a portion of the air output from the compressor (which is not subjected to ignition in the combustor and so is relatively cooler) and feed this to surfaces in the turbine section which are likely to suffer damage from excessive heat. Typically the cooling air is delivered adjacent the rim of the turbine disc and directed to a port which enters the turbine blade body and is distributed through the blade, typically by means of a labyrinth of channels extending through the blade body. Heat transfers between this cooling air flow and the turbine disc can increase thermal gradients in the disc leading to the disc material being subjected to an increased stress range. This stress range is a limiting factor in the life of the disc.

Various component bucket groove heat shields are known. An example is described in the Applicant's prior published U.S. Pat. No. 8,845,288B. Such arrangements involve complex and time consuming assembly and often suffer from leakage of coolant air into the bucket groove.

It is known to provide turbine blades which incorporate an integral heat shield at the root. The blade root is shaped to fit the contours of a bucket groove which extends radially inwardly of the disc rim. A duct (into which cooling air for the blade is to be received) is machined into the blade root leaving a duct wall adjacent the radially innermost surface of the bucket groove. The duct wall serves as a heat shield between the disc body and the coolant flow. An example is described in Applicant's co-pending European patent application no. EP16162567.8. Whilst effective, such heat shields present complex manufacturing challenges. Cooling channels extending from the duct through the blade body have carefully designed inlet geometries and dimensions which serve to encourage dominant flow to regions of the blade which most need it. In addition it may be desirable to apply finishing operations such as coating to the channels. The presence of the integral shield presents an obstacle to the performance of such finishing operations.

An objective of the present disclosure is to mitigate issues with the prior art arrangements.

BRIEF SUMMARY

In accordance with the present disclosure there is provided an assembly for receiving a blade in a radially extending bucket groove of a disc. The assembly including a blade having an elongate body of aerofoil cross-section, a root portion at one end of the aerofoil body and a tip at the other. The root portion configured to be retained in the bucket groove. The assembly further including a heat shield configured to be received between an end of the root portion and a radially inner surface of the bucket groove and to interlock with the root portion in a manner which deters separation in a radial direction.

The blade may be a turbine blade for a turbine disc. For example the turbine blade and turbine disc form part of a turbine stage in a gas turbine engine.

A cooling air inlet duct may be machined into the assembly from a front or rear face of the assembly. The inlet duct may be formed partly in the heat shield and partly in the root portion.

For example the root portion includes a pair of elongate grooves extending between a front face and a rear face of the root portion and the heat shield includes a pair of elongate ribs extending between a front face and a rear face of the heat shield and the ribs are configured to engage in the elongate grooves whereby to prevent separation of the heat shield and root portion in a blade root to blade tip direction. The ribs and grooves may extend continuously from the front face to the rear face. Alternatively, the ribs and grooves may extend only partway between the front face and rear face.

In an alternative, the ribs may be replaced with castellations and the grooves with intermittent slots for receiving the castellations.

The front face of the heat shield may extend to form a shield which, in use, extends over a front face of the disc rim to thermally shield the disc rim and to seal gaps between the heat shield and the bucket groove at the front face of the disc.

On a coolant inlet side of the assembly, the heat shield may extend to form an upstream facing incline. In use, the incline serves to guide cooling air into a cooling duct extending from a front face and into the root portion and radially outwardly, via one or more cooling channels intersecting the duct, into the elongate body of the blade. The incline may have a curved profile, for example, the incline is convexly curved. Curvature of the incline may be in three dimensions. For example, the extension may be paddle-shaped. The inclines may further serve to recover pressure losses arising between turbine stages.

In some embodiments, the bucket groove and root portion have non-linear walls in a radial direction. The heat shield may incorporate an internal recess arranged to hook over a protrusion on a wall of the root portion, alternatively, the heat shield may comprise an internal protrusion configured to engage in a recess of the root portion. For example, the root portion and bucket groove have a "fir tree" shape in a radial direction. Such root portion shapes are known: the fir tree tapers towards the end of the root portion distal to the elongate body and includes steps along the tapering sides. The root portion can be inserted into a similarly shaped bucket groove from an axially facing surface of the disc.

The heat shield may comprise a different material from the blade and/or the disc. For example, a plurality of blades and a disc form a turbine in a gas turbine engine and the material of the heat shield comprises a lower grade alloy than the blades.

In another option, the disc rim may be profiled to complement the heat shield profile and further discourage leakage into a gap between the heat shield and the bucket groove.

In another aspect, the assembly comprises a plurality of blades of the above-described configuration and conglomerate of the above described heat shields integrally formed together in a circular or part circular configuration, the heat shields spaced apart circumferentially so as to coincide with the spacing of a circumferential array of bucket grooves on the disc. For example, the conglomerate of heat shields is mechanically mounted around an annular plate which, in use, serves as a rim shield for the disc. The conglomerate of heat shields and annular plate may alternatively be machined from a single casting. In another option the conglomerate of heat shields may be welded to the annular plate. Other means for conjoining the conglomerate of heat shields to the annular plate will no doubt occur to the skilled addressee without departing from the scope of the present disclosure as defined by the appended claims. The annular plate may have an incline on an annular face thereof, the incline arranged to guide air towards the root portion of the blade. The incline may be curved.

BRIEF DESCRIPTION OF DRAWINGS

Embodiments of the present disclosure will now be further described with reference to the accompanying Figures in which.

DETAILED DESCRIPTION OF DRAWINGS AND EMBODIMENTS

Figure 1:
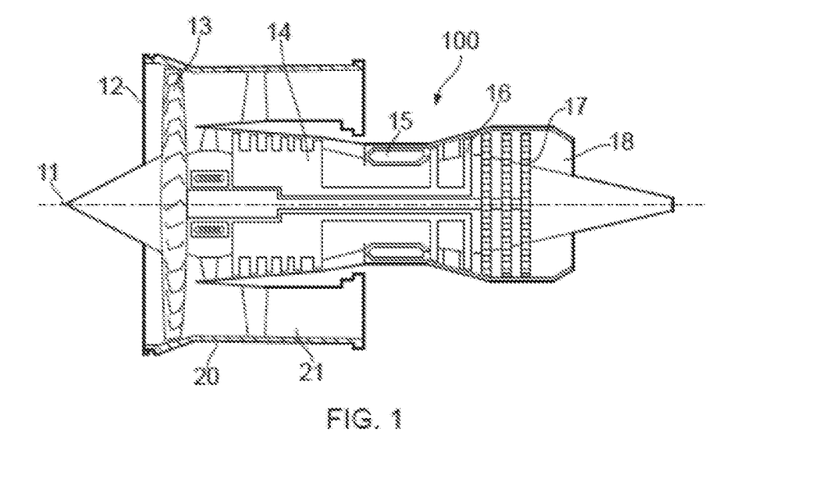
FIG. 1 shows a section of a gas turbine engine into which assemblies of the present disclosure might usefully be incorporated.

With reference to FIG. 1, a gas turbine engine is generally indicated at 100, having a principal and rotational axis 11. The engine 10 comprises, in axial flow series, an air intake 12, a propulsive fan 13, a high-pressure compressor 14, combustion equipment 15, a high-pressure turbine 16, a low-pressure turbine 17 and an exhaust nozzle 18. A nacelle 20 generally surrounds the engine 100 and defines the intake 12.

The gas turbine engine 100 works in the conventional manner so that air entering the intake 12 is accelerated by the fan 13 to produce two air flows: a first air flow into the high-pressure compressor 14 and a second air flow which passes through a bypass duct 21 to provide propulsive thrust. The high-pressure compressor 14 compresses the air flow directed into it before delivering that air to the combustion equipment 15.

In the combustion equipment 15 the air flow is mixed with fuel and the mixture combusted. The resultant hot combustion products then expand through, and thereby drive the high and low-pressure turbines 16, 17 before being exhausted through the nozzle 18 to provide additional propulsive thrust. The high 16 and low 17 pressure turbines drive respectively the high pressure compressor 14 and the fan 13, each by a suitable interconnecting shaft.

Assemblies in accordance with the present disclosure may usefully be employed in stages of one or more of the turbines 16 and 17.

Other gas turbine engines to which the present disclosure may be applied may have alternative configurations. By way of example such engines may have an alternative number of interconnecting shafts (e.g. three) and/or an alternative number of compressors and/or turbines. Further the engine may comprise a gearbox provided in the drive train from a turbine to a compressor and/or fan.

Figure 2:
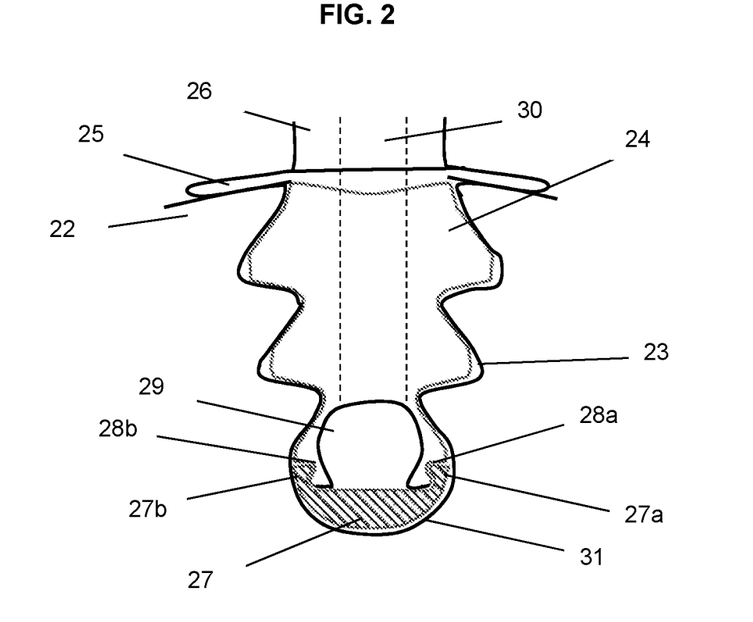
FIG. 2 shows a first embodiment of an assembly in accordance with the present disclosure.

With reference to FIG. 2, a turbine rotor disc 22 has an annular array of fir tree shaped bucket grooves 23 of which one is shown. A turbine blade includes a root portion 24 shaped and proportioned to fit in a bucket groove 23. The root portion sits beneath a blade platform 25 from which extends an elongate blade body 26 which has an aerofoil shaped cross section. The root portion 24 stops short of a radially inner surface of the bucket groove 23 to leave a space which is filled by heat shield 27. The heat shield 27 has a recess flanked by a pair of inwardly projecting ribs 27a, 27b. The ribs 27a, 27b slot into complementing grooves 28a, 28b on side walls of the root portion 24. An inlet for a duct 29 is provided in a front face of the root portion 24. Part of the wall of the duct is provided by the heat shield 27. The interlocking arrangement between ribs 27a, 27b and complementing grooves 28a, 28b serve to seal air into the duct 29. Inside the blade body 26 one or more cooling channels 30 extends lengthwise from an intersection with the duct 29 through the root portion 24, the platform 25 and along the blade body 26. A small gap 31 is present between the bucket groove surface 31 and heatshield 27 allowing for engineering tolerances and differential thermal resizing between the components.

Typically (as is more clear from FIG. 4) the diameter of the duct 29 will reduce from the inlet end to an opposite end creating a pressure differential designed to encourage dominant flow into a cooling channel adjacent a leading edge of the blade. This can optionally be achieved through shaping of the heat shield 33. In the Figures shown, the leading edge faces in the same direction as the front face of the root portion 24. It is to be appreciated, however, that the inlet could be arranged on a trailing edge side of the blade.

Some leakage of coolant air delivered to the inlet of duct 29 may enter the gap 31.

Figure 3:
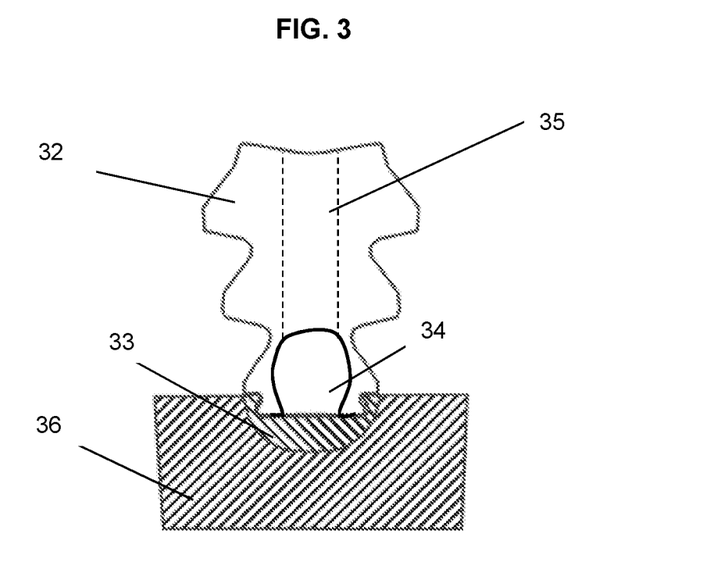
FIG. 3 shows a first view of a second embodiment of an assembly in accordance with the present disclosure.

FIG. 3 shows a simplified figure representing a second embodiment of an assembly according to the present disclosure. The figure shows only the root portion 32 and heat shield 33. It should be understood that other features such as the blade body and disc (not shown) will be broadly the same as shown in FIG. 2.

In common with the embodiment of FIG. 2, the root portion 32 is shaped to define a duct 34, the wall of which is partly provided by the heat shield 33. A cooling channel 35 intersects with the duct and extends through the root portion 32.

The heat shield 33 is provided with a plate 36. It will be appreciated; the plate is proportioned to cover any space between the heat shield 33 and a bucket groove of a disc into which the root portion 32 might be received.

Figure 4:
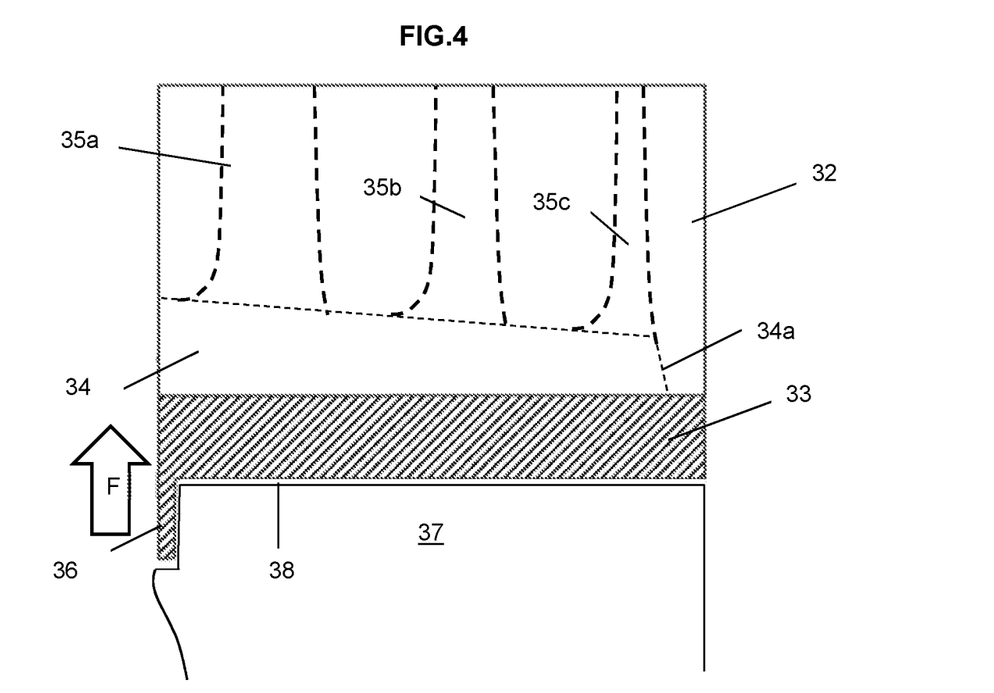
FIG. 4 shows a second view of the second embodiment of the assembly in accordance with the present disclosure.

FIG. 4 shows an alternative view of the embodiment of FIG. 3 in an axial section. As can be seen a blade root portion 32 is assembled with a heat shield 33 and the assembly is received in a bucket groove of a disc 37. Duct 34 extends from an inlet at the front face of the root portion 32 terminating just short of a rear face of the root portion 32. Leading edge 35a, mid 35b and trailing edge 35c cooling passages each intersect with the duct 34 and extend through the root portion 32 and into the elongate blade body (not shown). Other blade cooling passage arrangements will be known to the skilled addressee and do not depart from the inventive concept as defined by the accompanying claims. As can be seen the plate 36 extends over a front face of the disc 37 providing a barrier to entry of an oncoming flow F of cooling air into the gap 38 between the disc 37 and heat shield 33. The disc is contoured just below the to assist in directing flow F away from the clearance space 38.

Figure 5:
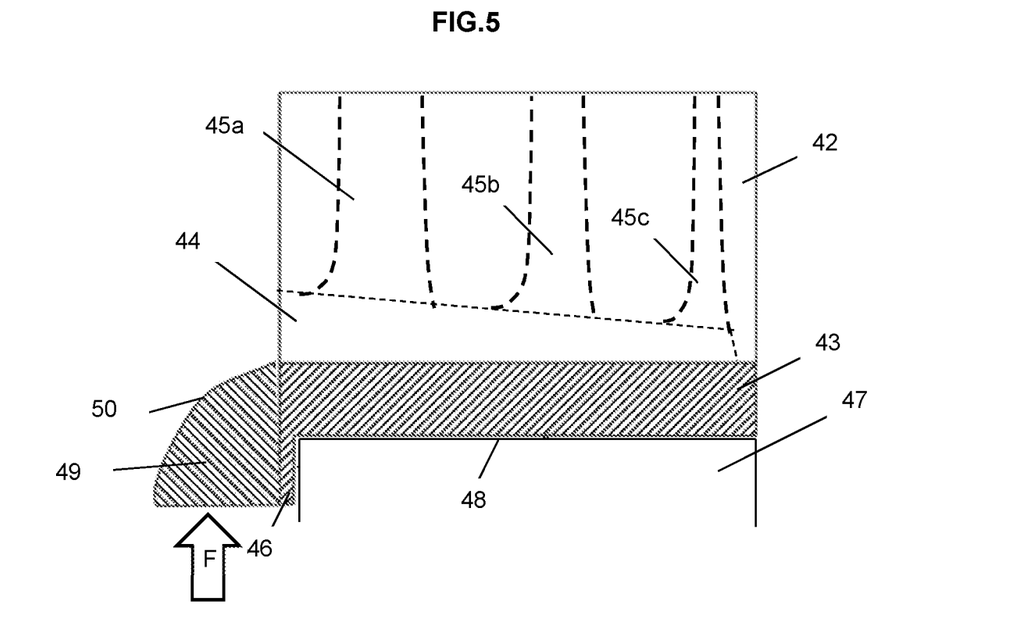
FIG. 5 shows a third embodiment of the present disclosure.

FIG. 5 shows another embodiment of an assembly in accordance with the present disclosure. In common with the arrangement of FIG. 4, the assembly comprises a root portion 42 and heat shield 43. The assembly is received in a bucket groove of a disc 47. Duct 44 extends from an inlet at the front face of the root portion 42 terminating just short of a rear face of the root portion 42. Leading edge 45a, mid 45b and trailing edge 45c cooling passages each intersect with the duct 44 and extend through the root portion 42 and into the elongate blade body (not shown). As can be seen, a plate 46 extends over a front face of the disc 47 providing a barrier to entry of an oncoming flow F of cooling air into the gap 48 between the disc 34 and heat shield 43. A front face of the plate 46 has an adjutting portion 49. A front face 50 of the adjutting portion 49 inclines and curves towards the inlet of the duct 44. This front face geometry encourages flow F to turn towards the inlet of duct 44.

Figure 6:
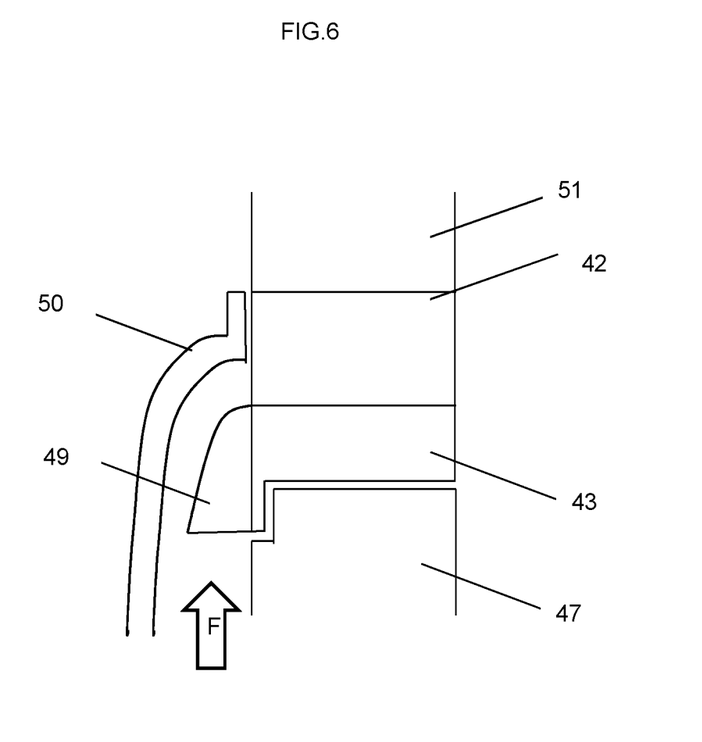
FIG. 6 shows the third embodiment in situ in a turbine rotor.

FIG. 6 shows the assembly of FIG. 5 in situ in a turbine rotor. As can be seen, the heat shield 43 attaches to root portion 42 and is received in a bucket groove of the disc 47. An aerofoil-shaped blade 51 extends radially outwardly from the root portion 42. A disc cover plate 50 covers a front face of the assembly, shielding it from flows in a gap between the rotor and an adjacent stator (not shown).

Figure 7:
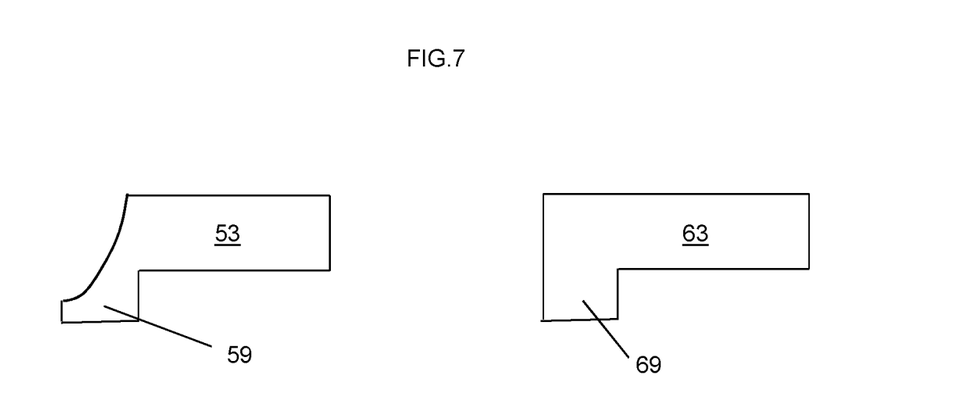
FIG. 7 shows alternative geometries for the heat shield.

FIG. 7 shows alternative geometries for an adjutting portion 59, 69 of a heat shield 53, 63.

Figure 8:
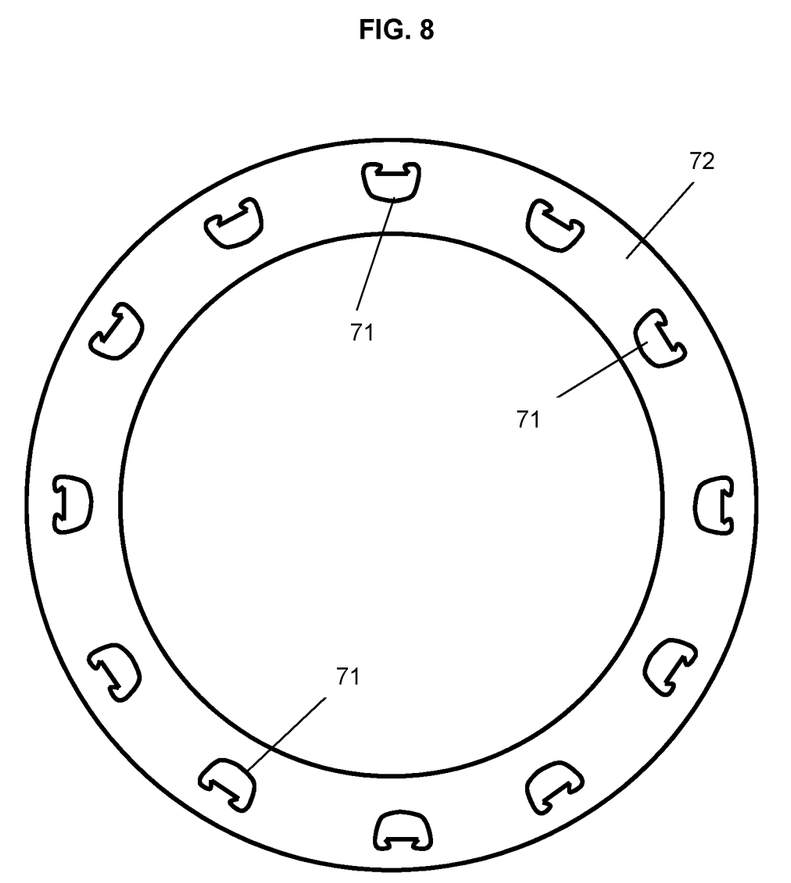
FIG. 8 shows a fourth embodiment of the present disclosure.

FIG. 8 relates to another embodiment of an assembly in accordance with the present disclosure. The figure shows a conglomerate of heat shields 71 arranged in a circumferential array around an annular plate 72. The annular plate 72 is proportioned to match or approximately match the outer diameter of a disc (not shown) into which a plurality of blades might be received. The heat shields 71 are spaced in a manner which matches the spacing of a circumferential array of bucket grooves in the disc. Individual blades which may have a configuration broadly similar to that shown in FIG. 2 are received into the bucket grooves leavings gaps into which the conglomerate of heat shields 71 may be received. The annular plate 72 serves as a rim seal for the disc and as a cover for any leakage gaps between the heat shields 71 and bucket groove.

Optionally, the annular plate 71 may include an adjutting front face (on an opposite side of the plate to the conglomerate heat shields 71) shaped to guide oncoming flow into ducts of root portions of the aforementioned individual blades.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A blade and shield assembly configured to be received in a radially extending bucket groove of a rotor disc, the assembly comprising;
    a blade having an elongate body of aerofoil cross-section, a root portion at one end of the elongate body and a tip at the other, the root portion configured to be retained in the bucket groove, the root portion of the blade including a plurality of steps along a first side and a second side of the root portion, the first side having a first elongate groove between a first two of the steps, and the second side having a second elongate groove between a second two of the steps; and
    a heat shield configured to be received between an end of the root portion and a radially inner surface of the bucket groove and to interlock with the root portion in a manner which deters separation in a radial direction, wherein the heat shield includes a first elongate rib and a second elongate rib, and wherein, to interlock the heat shield with the root portion of the blade, the first elongate rib projects into the first elongate groove between the first two of the steps on the first side of the root portion and the second elongate rib projects into the second elongate groove between the second two of the steps on the second side of the root portion,
    wherein the heat shield includes a recess, the recess including a first side terminated by the first elongate rib, a second side terminated by the second elongate rib, and a flat surface extending between the first side and the second side, wherein a radially innermost step of the first two of the steps of the root portion and a radially innermost step of the second two of the steps of the root portion are configured to contact the flat surface of the recess when the blade and the heat shield are received in the radially extending bucket groove of the rotor disc.

2. The assembly as claimed in claim 1, further including a cooling air duct, the cooling air duct being defined partly by the root portion and partly by the heat shield.

3. The assembly of claim 1, wherein the first elongate groove and the second elongate groove extend from a front face to a rear face of the root portion and the first elongate rib and the second elongate rib extend from a front face to a rear face of the heat shield, and wherein the first and second elongate ribs are configured to engage in the first and second elongate grooves, respectively, which prevents separation of the heat shield and the root portion of the blade in a blade root to blade tip direction.

4. The assembly as claimed in claim 1, wherein a front face of the heat shield extends to form a cover which, in use, extends over a front face of the disc to cover gaps between the heat shield and the bucket groove at the front face of the disc.

5. The assembly of claim 1, wherein the heat shield extends to form an upstream facing incline.

6. The assembly of claim 5, wherein the incline has a curved profile.

7. The assembly of claim 6, wherein the curved profile is convex.

8. The assembly of claim 6, wherein the curvature of the curved profile is in three dimensions.

9. The assembly of claim 5, wherein the extended portion of the heat shield is paddle-shaped.

10. The assembly of claim 1 wherein the root portion and bucket groove each have a fir tree shape.

11. The assembly of claim 1 comprising a plurality of blades and a conglomerate of heat shields, the heat shields arranged in a circumferential array around an annular plate.

12. The assembly of claim 1 further comprising a plurality of blades and a plurality of heat shields, wherein the blades include the blade, the heat shields include the heat shield, the disc includes a circumferential array of a plurality of bucket grooves, the bucket grooves include the bucket groove, and wherein each of the bucket grooves is proportioned and arranged to receive a respective one of the plurality of blades and a respective one of the plurality of heat shields.

13. A turbine stage for a gas turbine engine incorporating one or more assemblies each configured in accordance with the assembly of claim 1.

14. A gas turbine engine including one or more turbine stages, the turbine stages each having the configuration of claim 13.

* * * * *